United States Patent
Schultz et al.

(10) Patent No.: US 8,243,062 B2
(45) Date of Patent: Aug. 14, 2012

(54) SURFACE DESIGN TOOLS

(75) Inventors: Marissa A. K. Schultz, Racine, WI (US); William A. Bachman, Pewaukee, WI (US); Marcia L. Santaga, Waterford, WI (US); Eric J. Minor, Lake Villa, IL (US)

(73) Assignee: S.C. Johnson & Son, Inc., Racine, WI (US)

( * ) Notice: Subject to any disclaimer, the term of this patent is extended or adjusted under 35 U.S.C. 154(b) by 945 days.

(21) Appl. No.: 12/166,805

(22) Filed: Jul. 2, 2008

(65) Prior Publication Data

US 2010/0001992 A1 Jan. 7, 2010

(51) Int. Cl.
*G06T 17/00* (2006.01)
(52) U.S. Cl. ........................ 345/419; 345/582
(58) Field of Classification Search .................. None
See application file for complete search history.

(56) References Cited

U.S. PATENT DOCUMENTS

| | | | |
|---|---|---|---|
| 4,888,713 A * | 12/1989 | Falk | 345/582 |
| 5,053,956 A | 10/1991 | Donald et al. | |
| 5,232,535 A | 8/1993 | Brinley | |
| 5,252,379 A | 10/1993 | Kuribayashi et al. | |
| 5,291,395 A | 3/1994 | Abecassis | |
| 5,422,809 A | 6/1995 | Griffin et al. | |
| 5,473,738 A | 12/1995 | Hamilton | |
| 5,663,746 A | 9/1997 | Pellenberg et al. | |
| 5,781,909 A | 7/1998 | Logan et al. | |
| 5,806,688 A | 9/1998 | Adenau et al. | |
| 5,884,282 A | 3/1999 | Robinson | |
| 6,002,855 A | 12/1999 | Ladner et al. | |
| 6,064,980 A | 5/2000 | Jacobi et al. | |
| 6,094,675 A | 7/2000 | Sunaga et al. | |
| 6,243,722 B1 | 6/2001 | Day et al. | |
| 6,331,858 B2 | 12/2001 | Fisher | |
| 6,343,264 B1 * | 1/2002 | Fenton et al. | 703/6 |
| 6,358,461 B1 | 3/2002 | Law et al. | |
| 6,459,435 B1 | 10/2002 | Eichel | |
| 6,529,206 B1 * | 3/2003 | Ohki et al. | 345/619 |

(Continued)

FOREIGN PATENT DOCUMENTS

DE 10249812 A1 5/2004

(Continued)

OTHER PUBLICATIONS

International Search Report and Written Opinion dated Mar. 11, 2010 Appl. No. PCT/US2009/003941.

*Primary Examiner* — Ulka Chauhan
*Assistant Examiner* — Andrew G Yang (57) ABSTRACT

A method of designing a consumer-selected surface includes the steps of displaying a representation of a surface, displaying one or more patterns that may be applied to the representation of the surface, and receiving a selection from a user of a pattern selected from the one or more patterns. The method also includes the steps of allowing the user to locate on the selected pattern at a position on the representation of the surface, the position being independent of a size or shape of the selected pattern, and allowing the user to modify the positioned pattern by altering at least one characteristic thereof to develop a modified representation of the surface. Further, the method includes the steps of generating a three-dimensional view of a room that includes a rendering of the modified representation of the surface and providing the generated three-dimensional view to the user.

11 Claims, 7 Drawing Sheets

U.S. PATENT DOCUMENTS

| | | |
|---|---|---|
| 6,563,510 B1 | 5/2003 | Rice et al. |
| 6,606,602 B1 | 8/2003 | Kolls |
| 6,632,093 B1 | 10/2003 | Rice |
| 6,694,355 B1 | 2/2004 | Bahar |
| 6,727,925 B1 | 4/2004 | Bourdelais |
| 6,816,752 B1 | 11/2004 | Wang |
| 6,912,293 B1 * | 6/2005 | Korobkin ................. 382/100 |
| 6,959,646 B2 | 11/2005 | Fujii et al. |
| 6,992,028 B2 | 1/2006 | Thomaschefsky et al. |
| 7,003,515 B1 | 2/2006 | Glaser et al. |
| 7,008,889 B2 | 3/2006 | Black et al. |
| 7,193,632 B2 | 3/2007 | Rice et al. |
| 7,216,092 B1 | 5/2007 | Weber et al. |
| 7,230,629 B2 | 6/2007 | Reynolds et al. |
| 7,299,217 B2 | 11/2007 | Oni |
| 7,330,585 B2 | 2/2008 | Rice et al. |
| 7,356,453 B2 | 4/2008 | Gould |
| 7,479,956 B2 * | 1/2009 | Shaw-Weeks ............... 345/419 |
| 7,523,411 B2 * | 4/2009 | Carlin ......................... 715/782 |
| 2002/0035512 A1 | 3/2002 | Pavlik |
| 2002/0099725 A1 | 7/2002 | Gordon |
| 2004/0034576 A1 | 2/2004 | Jones et al. |
| 2004/0161727 A1 | 8/2004 | Brodine |
| 2005/0010473 A1 | 1/2005 | McLaughlin |
| 2006/0020482 A1 | 1/2006 | Coulter |
| 2006/0135668 A1 | 6/2006 | Hayes |
| 2006/0184884 A1 | 8/2006 | Chaturvedi |
| 2007/0232179 A1 | 10/2007 | Polat et al. |
| 2009/0259567 A1 | 10/2009 | Watts |

FOREIGN PATENT DOCUMENTS

WO         9847106 A1     10/1998

* cited by examiner

SURFACE DESIGN TOOLS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present disclosure relates to methods and systems that allow a user to develop and evaluate a design on a surface.

2. Description of the Background of the Invention

Improving the aesthetics in homes has long been practiced by many consumers. There is a plethora of home products and techniques for cleaning surface areas of soft surfaces, such as carpets, rugs, draperies, curtains, upholstery, and the like. For more sullied and/or worn surfaces, subtractive processes are sometimes used, for example, processes that chemically or physically remove something from the carpet, such as chemical cleaners or shaving. However, such cleaning products and subtractive processes often cannot truly restore the surface to its original state, which is often very frustrating for consumers.

Additive processes for improving the aesthetics of surfaces are also known, for example, processes that layer, cover, or mask something undesirable underneath, including painting, faux painting, stenciling, bordering, wallpapering, tiling, wainscoting, paneling, decorative plastering, adding appliqués, laminating, molding, and the like.

Generally, designs for such additive processes have been developed by design professionals with input from the consumer. As a result, the design process for such processes have typically required a consumer to visit a showroom or for a design professional to visit the consumer's home, which results in a time consuming and costly process.

Consequently, there has developed a need for consumers to be able to conveniently develop their own designs, e.g., using computer aided design programs. Such computer aided design programs have been available both online, e.g., via an internet website, and offline, e.g., through purchase of a software package. In a first example of a computer aided design program, a consumer selects a product, e.g., clothing, office and school supplies, sporting equipment, etc., and personalizes such product with pictures, text, logos, and the like. In a second example of a computer aided design program, a consumer selects and arranges furniture in a three-dimensional representation of a room before purchasing and/or physically rearranging such furniture. However, the above first and second examples of computer aided design programs do not adequately aid the consumer in developing their own designs, but merely allow the consumer to select from pre-existing designs to modify a product in the first example or to rearrange furniture in a room in the second example.

Two dimensional design programs, for example, Adobe Illustrator®, developed by the Adobe Corporation of San Jose, Calif., or CorelDraw®, developed by the Corel Corporation of Ottawa, Canada, allow users to compose two-dimensional drawings. Such programs have vector-drawing tools that allow the user to compose shapes using lines, arcs, curves, and the like. Such drawings may also allow the user to select colors that may be applied to shapes drawn thereby.

However, such prior programs do not allow a user to design a surface using the additive processes described in, for example, Shah et al. U.S. patent application Ser. No. 12/152,322, Bass et al. U.S. patent application Ser. No. 12/152,405, filed on the same day as the present disclosure, each of which is incorporated herein by reference in its entirety. Such additive processes allow a customer to develop designs that can be applied to a soft surface, such as carpets, rugs, draperies, curtains, upholstery, and the like. In one embodiment, the designs are applied using one or more stencils and colorants. Therefore, a need is present for a convenient and effective program to aid in the development of such designs. Still further, it would be an added benefit if such program could allow a user to view a design on a surface in a virtual environment that resembles the actual environment where the design is to be applied before the user decides to apply the design to the surface.

SUMMARY OF THE INVENTION

According to one embodiment, a method of designing a consumer-selected surface includes the steps of displaying a representation of a surface, displaying one or more patterns that may be applied to the representation of the surface, and receiving a selection from a user of a pattern selected from the one or more patterns. The method also includes the steps of allowing the user to locate on the selected pattern at a position on the representation of the surface, the position being independent of a size or shape of the selected pattern, and allowing the user to modify the positioned pattern by altering at least one characteristic thereof to develop a modified representation of the surface. Further, the method includes the steps of generating a three-dimensional view of a room that includes a rendering of the modified representation of the surface and providing the generated three-dimensional view to the user.

According to another embodiment, a method of designing a surface includes the step of displaying a representation of a surface selected by a user from one or more pre-defined representations of the surface, each pre-defined representation comprising one or more patterns positioned thereon. Further, the method includes the steps of allowing a user to modify the selected pre-defined representation of the surface, generating a three-dimensional view of a room that includes a rendering of the representation of the surface, and displaying the generated three-dimensional view to the user.

According to yet another embodiment, a system for designing a surface includes a display that displays a representation of a surface and one or more patterns that may be applied to the representation of the surface and an input device configured to receive instructions from a user to develop a modified representation of the surface. The instructions can include selecting a pattern from the one or more patterns, locating the selected pattern on the representation of the surface, and/or modifying at least one characteristic of the selected pattern. In addition, the system includes a processor that is programmed to generate a three-dimensional view of a room that includes a rendering of the modified representation of the surface.

Other aspects and advantages of the present invention will become apparent upon consideration of the following detailed description.

DETAILED DESCRIPTION OF THE DRAWINGS

Figure 1:
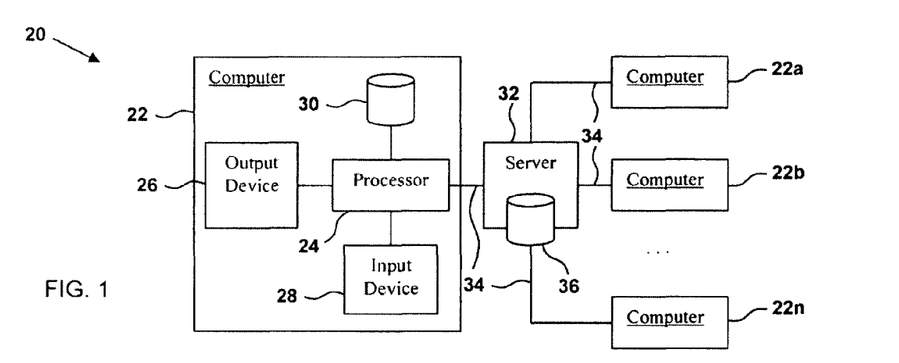
FIG. 1 is block diagram of a system according to a first embodiment.

FIG. 1 illustrates a system 20 that includes a computer 22. The computer 22 further includes a processor 24 coupled to an output device 26, an input device 28, and a computer memory 30. The processor 24 includes hardware and software adapted to operate on any appropriate operating system, e.g., Microsoft Windows, Mac OS, Linux, etc., as would be apparent to one of ordinary skill in the art. In one embodiment, the software includes multimedia software, e.g., Adobe Flash Player 8, and an internet browser, e.g., Internet Explorer, Firefox, Safari, or Opera. The processor 24 controls the operation of the system 20 in accordance with programming stored in the computer memory 30 and instructions received through the input device 28. In addition, the processor 24 controls the output device 26 to display information to a user, such as a representation of a surface to be designed. The input device 28 can include one or more devices, such as a keyboard, a mouse, a USB drive to receive data from a flash drive, a CD or DVD drive, or any other type of device that allows a user to input instructions to the computer 22. In one embodiment, the output device 26 is a display screen and/or a printer. By way of non-limiting example, the computer 22 can be embodied in a user's personal computer and/or in a kiosk. Other modifications to the computer can be made as would be apparent to one of ordinary skill in the art.

The system of FIG. 1 can also include a server 32 coupled to the computer 22 and a plurality of other computers 22a-22n via a wired or wireless connection 34 to form a network of computers that can communicate with each other and the server. Such other computers 22a-22n can include respective output devices, input devices, and memory similar to the computer 22. Further, the server 32 includes appropriate hardware, e.g., a server memory 36, and software adapted to operate on any appropriate operating system, as would be apparent to one of skill in the art. In one embodiment, the connection 34 is an internet connection and the server 32 supports an internet based application that is accessible at the computer 22 via a website, for example. In this embodiment, the server 32 can be any appropriate server, e.g., an Apache web server, the application can be written in any known language, e.g., PHP 5, data in the server memory 36 can be managed using any known system, e.g., MySQL, and the internet connection can be any appropriate connection, e.g., DSL or Wi-Fi. Further modifications to the system 20 can be made as would be apparent to one of ordinary skill in the art.

In one embodiment, each of the computers 22 in FIG. 1 operates as a stand alone system or kiosk without need for the server 32. However, such stand alone systems can be periodically connected to the server 32 to receive and transmit relevant data, as would be apparent to one of ordinary skill.

Figure 2:
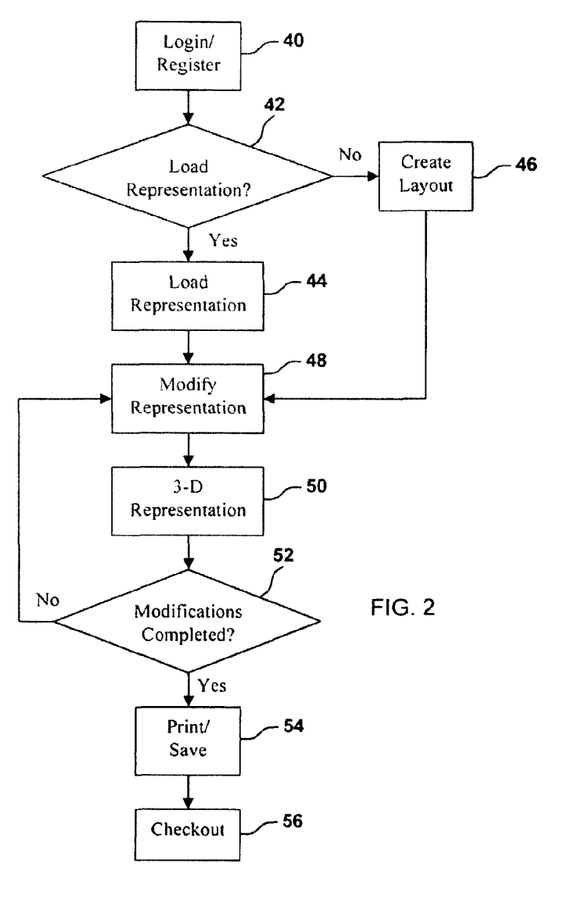
FIG. 2 is a flowchart that illustrates programming according to a second embodiment that may be executed by the system of FIG. 1.

Referring to FIG. 2, one embodiment of the programming implemented by the system 20 begins at a block 40, during which a new user can register or a registered user can login. Such registration/login procedures are well known in the art. For example, a registration procedure generally includes the entry of a username (e.g., an email address), a password, and/or other user specific information, such as, a mailing address, a credit card number, and the like. The information entered by the user can be stored locally in the computer memory 30 at the computer 22 and/or on the server memory 36. An example of a login procedure includes the entry of a username and password and a determination whether such entries match a username and password stored in the computer memory 30 and/or server memory 36. If the entries match, then the user is signed in and is allowed to proceed to the following steps. However, if the entries do not match, then the user is not signed in, and is allowed to either renter the login information or to proceed with the following steps as an anonymous user. In yet another example, the user can request an email sent to the user's email address with the password in the event that the user has forgotten the password. Alternatively, at the block 40, the user can decide to remain anonymous without registering or logging in.

After the block 40, control passes to a decision block 42 that determines whether to load a pre-defined representation of a surface. In the present embodiment, the pre-defined representation of the surface includes one or more patterns positioned thereon, as will be described in more detail hereinafter. The decision of the block 42 whether to load the pre-defined representation can be made according to a user input, lack thereof, or some other basis that would be apparent to one of skill in the art. If a pre-defined representation is to be loaded, then control passes to a block 44 to load the pre-defined representation. In one embodiment, the pre-defined representation is selected from one or more representations that were previously designed by the user, stored in the computer memory 30 and/or server memory 36, and made available for the user to select from after the user logs in. In another embodiment, the pre-defined representation is selected from one or more default representations or representations designed by one or more different users, wherein such representation(s) are stored in the computer memory 30 and/or server memory 36 and are made available to any user whether logged in or anonymous.

Referring back to the block 42, if a pre-defined representation is not to be loaded, then control passes to a block 46 and a layout is created for the representation of the surface. In one embodiment, the layout creation includes designating dimensions and/or a shape of the representation of the surface, e.g., designating a 10 foot by 10 foot square or a circle with a two meter radius, and displaying the created layout as a blank representation of the surface, i.e., without any patterns positioned thereon. From the blocks 44 or 46, control passes to a block 48 and the representation of the surface, either the pre-defined representation or the blank representation, is modified to develop a desired design. The layout modification procedure will be described in more detail hereinafter, but generally includes the selection of one or more patterns that can be placed in any desired position on the representation of the surface. In other embodiments, the modification procedure of the block 48 further includes modifying other characteristics of the pattern(s), such as adding or changing a color, overlaying patterns, changing the orientation, and the like.

After the representation has been modified at the block 48, control passes to a block 50 to generate a three-dimensional view of a room that includes a rendering of the modified representation. Thus, instead of viewing the modified representation in the sterile environment of a design screen, the user can evaluate such representation in a simulated real-world environment and gain an appreciation for how the modified representation will appear before purchasing the necessary supplies to implement the design and/or hiring a design professional to implement the design. For example, the three-dimensional view of the room can be a living room or a bedroom, wherein the modified representation is a design on a floor, wall, ceiling, etc., thereof. If the user is satisfied with the modified representation, then a decision block 52 determines whether the modification process is complete. If the user wishes to make further modifications, then control loops back to the block 48 from the decision block 52 and the user can further modify the representation until the user is satisfied. Once the modification is completed, control passes to a block 54 and the modified representation can be saved and/or printed, as would be apparent to one of ordinary skill in the art. Further, at a block 56 a checkout procedure can be implemented, as will be described in more detail hereinafter. In other embodiments, the flowchart of FIG. 2 can be modified to include fewer or additional processes in any desired order, as would be apparent to one of ordinary skill in the art.

Figure 3:
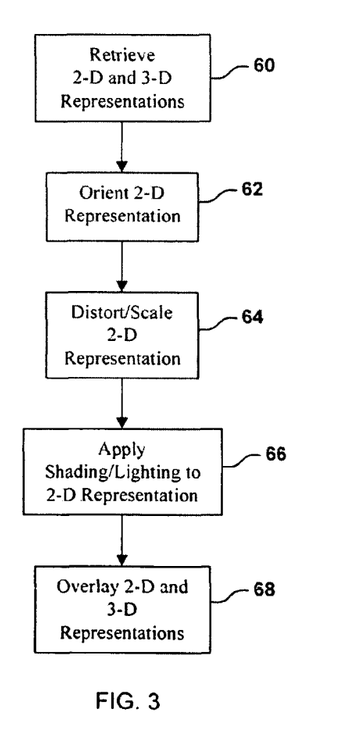
FIG. 3 is a flowchart that illustrates programming according to a third embodiment that may be executed to generate a three-dimensional view of a room that includes a rendering of a representation of a surface.

Referring to FIG. 3, one embodiment of programming executed to generate a three-dimensional view of a room that includes a rendering of a two-dimensional representation of a surface begins at a block 60, during which a two-dimensional representation of the surface, such as a user modified representation of the surface, and a three-dimensional view of a room are retrieved from memory, e.g., the computer memory 30 and/or server memory 36. Next control passes to a block 62 and the two-dimensional representation is oriented to match the position and orientation of a surface in the three-dimensional view. For example, the two-dimensional representation can be oriented to match a floor or a wall of the three-dimensional view. At a block 64, the two-dimensional representation can be distorted and/or scaled to match the approximate room dimensions in the three-dimensional view. At a block 66, shading and/or lighting that is associated with the three-dimensional view of the room can be applied to the two-dimensional representation of the surface. Following the block 66, the three-dimensional view is rendered or overlaid with the two-dimensional representation at a block 68. In other embodiments, some of the above blocks can be performed simultaneously and/or in different orders. Further, the flowchart of FIG. 3 can include fewer and/or additional blocks, as would be apparent to one of skill in the art.

Figure 4A:
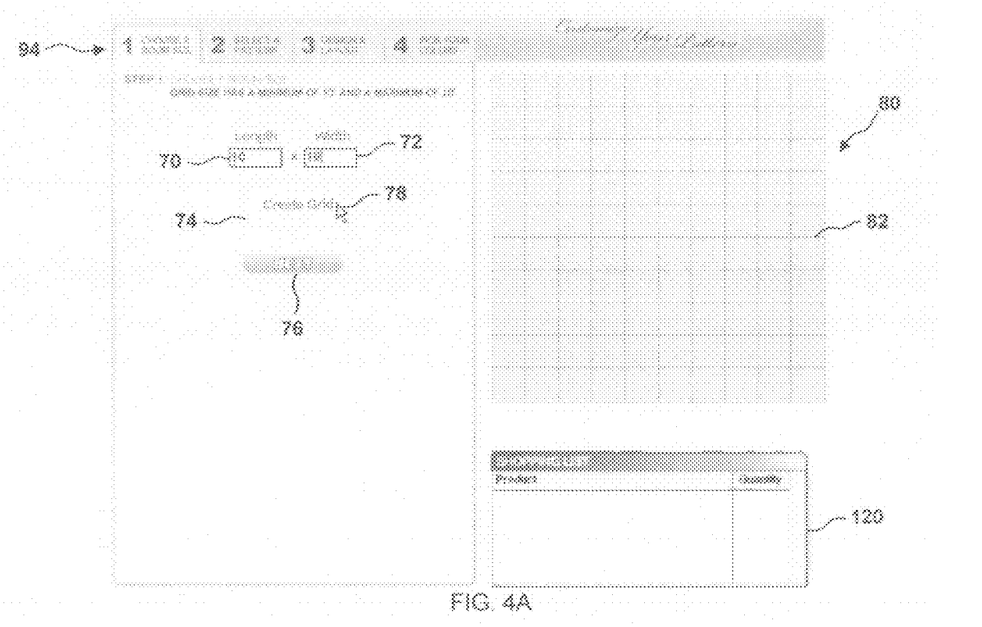
FIGS. 4A-4D illustrate design layout screens according to a fourth embodiment.

The various screens of FIGS. 4A-8B are generated by the system 20 and displayed to a user on a display device. In one embodiment, FIGS. 4A-8B can be implemented as a series of screens on a website that is accessible from a personal computer in a user's home and/or at a kiosk at a store, for example. The animation/rendering of the various screens can be performed using any known platform or technique, such as Adobe Flash Player or AJAX. In FIG. 4A, a user creates a layout for the representation of the surface by entering dimensions of the surface in a "Length" box 70 and a "Width" box 72 and clicking on a "Create Grid" button 74 or a "Next" button 76 using a cursor 78 controlled by an input device, such as a mouse. In the present example, the user has entered dimensions of ten feet by ten feet and has clicked on the "Create Grid" button 74 with the cursor 78 to create a two-dimensional representation of the surface 80 on a right portion of the screen. In FIG. 4A, the two-dimensional representation is a top elevational view of the surface 80 that includes a reference grid 82 of one foot square blocks that can be helpful for the placement of patterns on the surface. The size of the representation 80 and the reference grid 82 can be scaled depending on the size of the surface and/or the dimensions of the blocks that make up the reference grid, as would be apparent to one of ordinary skill. If the user had clicked the "Next" button 76, then a next screen will be displayed that includes the representation of the surface 80 without the reference grid 82.

Figure 4B:
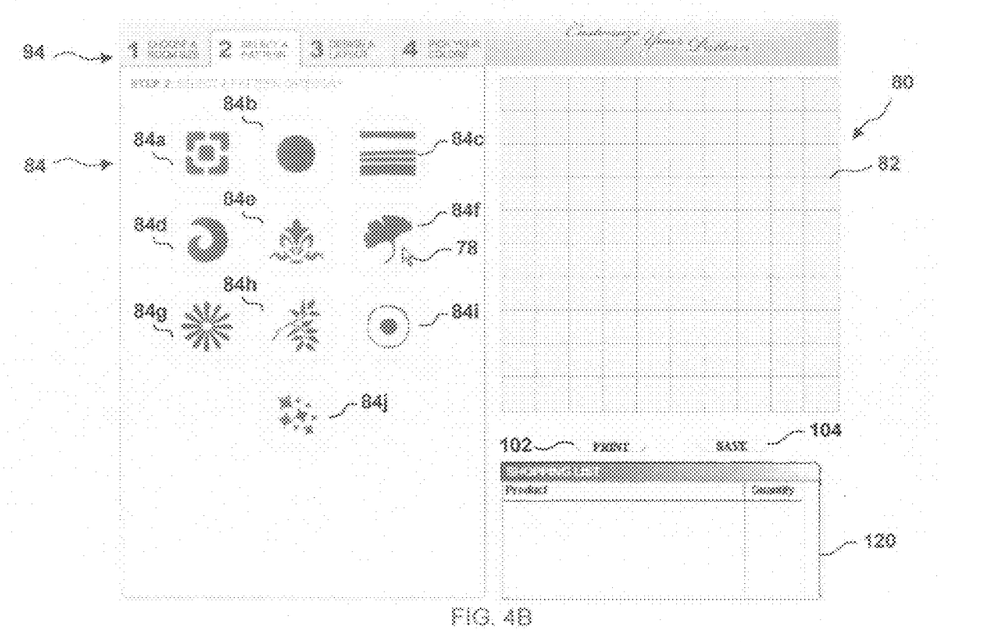

In FIG. 4B, a user selects a pattern category 84 from a list of categories. The pattern categories 84 are displayed as buttons/icons with a visual representation of the pattern category. In FIG. 4B, the pattern categories 84 include squares 84a, circles 84b, stripes 84c, waves and swirls 84d, fleur de lis 84e, leaves 84f, flowers 84g, leaves and branches 84h, circle and rectangle designs 84i, and diamonds 84j. To select a pattern category 84, the user simply clicks on the desired pattern category with the cursor 78. In other embodiments, fewer or additional pattern categories 84 can be used as would be apparent to those of skill in the art. In various embodiments, the pattern categories 84 can be default categories stored in the computer memory 30 and/or server memory 36 or can be user designed pattern categories, wherein such user designed pattern categories and user-designed patterns that comprise such categories can be supplied to the system 20 via an input device 28, such as a flash memory drive plugged into a USB port, a CD drive, or uploaded using the Internet. In some embodiments, the user may supply a user-designed pattern to the system by providing an electronic rendition (e.g., a scan or a file from a drawing application) thereof to the system. Some embodiments of the system associate a user-designed pattern with the user and limit the use of such patterns to only the user. In other embodiments, the user-designed pattern may be made available to other users of the system 20.

Figure 4C:
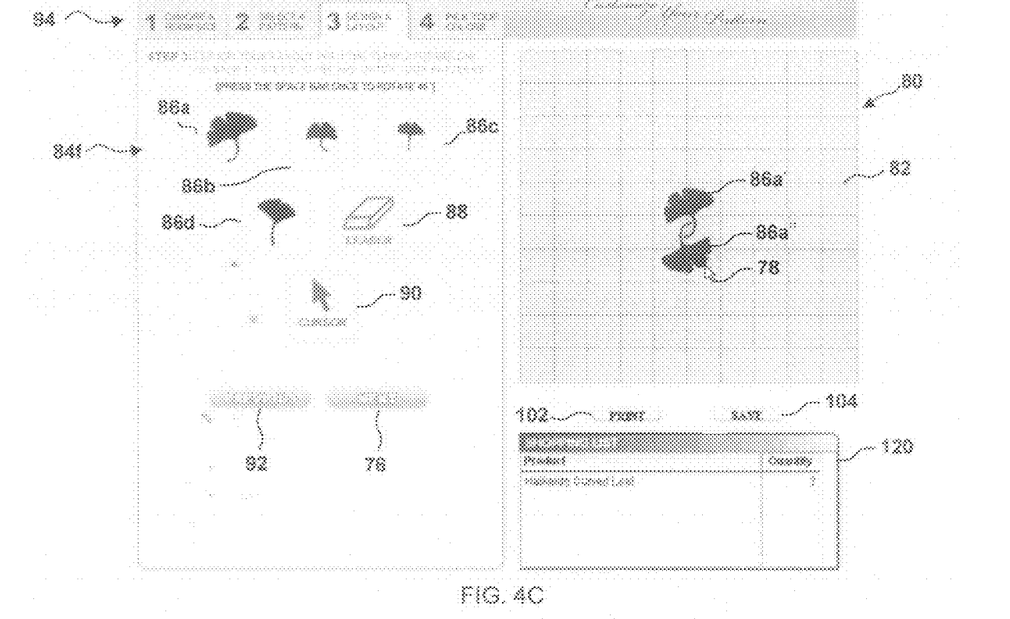

After the user has selected a pattern category 84, one or more patterns 86 associated with the selected pattern category are displayed as button/icons with a visual representation of the pattern for the user to select from. In some embodiments, the one or more patterns 86 associated with the selected pattern category may be displayed if the cursor 78 hovers over the pattern category 84 for longer than a predetermined period of time. Referring to FIG. 4C, the user has selected the leaves pattern category 84f, which includes four different patterns 86a, 86b, 86c, and 86d that can be selected by the user by clicking on the desired pattern with the cursor 78. After clicking on the desired pattern 86, such pattern becomes "attached" to the cursor 78, following the movement of the cursor around in the screen. In this manner, the user can move the cursor 78 to a desired location on the representation of the surface 80 and click once again to place the pattern 86 at such desired location. In one embodiment, the position of the pattern 86 on the representation of the surface 80 is not limited by the reference grid 82, which can be used merely as a reference, and the pattern can be placed anywhere on the surface 80 independently of a size or shape of the selected pattern. Further, the user may position the pattern substantially anywhere on the surface 80 and independent of any reference grid 82 that is within the capabilities of the display and the positioning device used thereby. Additionally, in this embodiment, the reference grid 82 is used only for aiding the user to align one or more patterns 86 on the surface 80 and is not associated with any characteristics of the pattern such as the size or the shape. As would be apparent to one of ordinary skill, the size of the pattern 86 can be scaled to match the dimensions of the representation of the surface 80 and the reference grid 82. Further, the orientation of a selected pattern 86 can be modified, e.g., by pressing a space bar or other key on a keyboard to rotate the pattern by a preset amount such as about 45°, by clicking on the pattern to display a menu that allows the user to modify the orientation, or any other method that would be apparent to one of ordinary skill. FIG. 4C illustrates an example that includes a first leaf 86a' generally positioned in a center of the surface 80 and a second leaf 86a" rotated about 180° and positioned below the first leaf 86a'. Further, in the screen of FIG. 4C the user can click on an "Eraser" button 88 to display an eraser icon (not shown) that becomes "attached" to the cursor 78 and follows the movement of the cursor around the screen. The user can then move the eraser icon over a pattern 86 on the representation of the surface 80 and click to erase the pattern. FIG. 4C also illustrates a "Cursor" button 90 that a user can click to return the cursor 78 to its original condition without any other icons attached thereto. Further, using the cursor 78 in its original condition also allows a user to click on a pattern 86 that has been placed in the representation of the surface 80 and modify the position and/or orientation thereof, using the procedures discussed herein. Still further, a "Previous" button 92 allows the user to return to a previous screen and the "Next" button 76 allows the user to proceed to a next screen. In addition to clicking on the "Previous" and "Next" buttons 92, 76, respectively, the user can click on various tabs 94 at a top of the screen to navigate between screens.

Figure 4D:
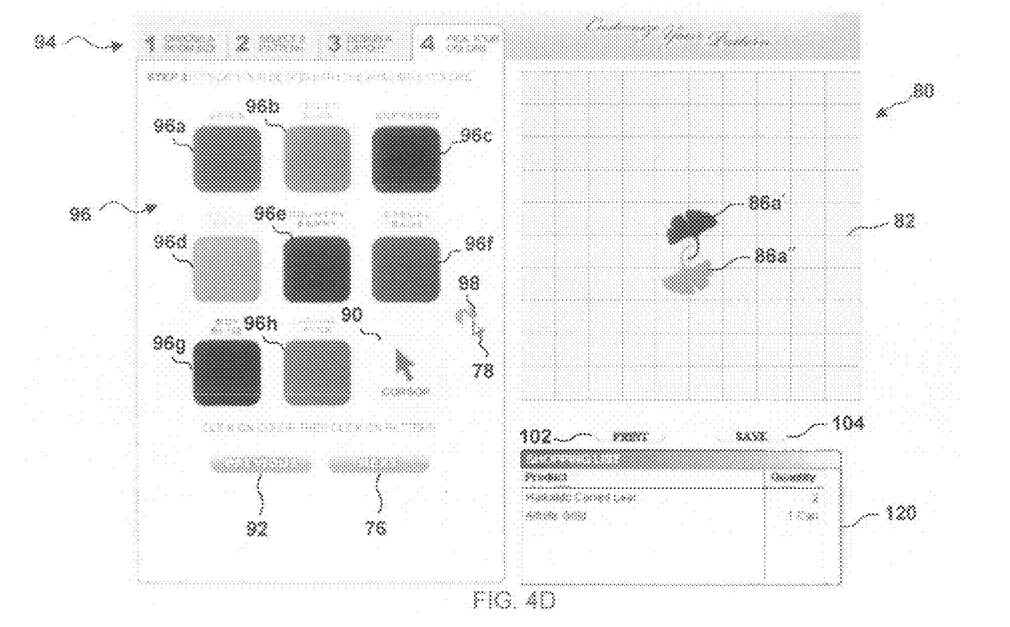

The screen of FIG. 4D illustrates an embodiment, wherein the user can select and apply a color 96 to one or more of the patterns 86 on the surface 80. In the present embodiment, the colors 96 are displayed as button/icons with a visual representation of the color and are stored in the computer memory 30 and/or server memory 36. The colors in FIG. 4D include Spice 96a, Veiled Sage 96b, Espresso 96c, Artistic Gold 96d, Country Berry 96e, Casual Blue 96f, Boy Blue 96g, and Jovial Pink 96h. However, in other embodiments, fewer or additional colors can be selected from, as would be apparent to a person of ordinary skill. In the present embodiment, to apply a color 96 to a pattern 86, the user clicks on the desired color with the cursor 78 and a paint bucket icon 98 becomes attached to the cursor, following the movement of the cursor around the screen. Thereafter, the user moves the cursor 78 with the attached paint bucket icon 98 over a pattern 86 and clicks to apply color thereto. The color 96 of the pattern 86 changes to the selected color to provide a visual confirmation that the color has been applied. FIG. 4D illustrates an example, wherein the user has applied the Artistic Gold 96d color to the leaf 86a". In another embodiment, a color 96 can be selected based on the pattern 86, e.g., the colors available for each pattern may vary. Further, in yet another embodiment, a color 96 can be selected by clicking on a pattern, e.g., 86a' or 86a", to display a pop-up or drop-down menu that allows a user to select a color.

In some embodiments, the visual confirmation provided to the user that a color has been applied to a pattern may be a representation of how the color may appear when applied to the surface and atop any underlying patterns and/or colors. For example, if the user applies the color Artistic Gold 96d to the leaf pattern 86a", the visual confirmation displayed may simulate the color Artistic Gold 96d mixed with the color of the surface 80 and of any other patterns (not shown) that may underlie the pattern 86". The simulated color may take into consideration the interaction (for example, opacity, color mixing) of a colorant associated with the color Artistic Gold 96d and a consumer-selected surface (such as the soft surfaces described above, a wall, furniture, etc.). In some embodiments, the user may provide the color of the consumer-selected surface by, for example, selecting such surface from those preconfigured in the system or by using a calorimeter or a scanner that measures the color of a sample of the consumer-selected surface. Such color scanner useful in the present disclosure is disclosed in Rice et al., U.S. Pat. No. 6,563,510, the entirety of which is incorporated herein. The simulated color thereafter may use the user provided color of the consumer-selected surface to develop the simulated color.

Figure 5A:
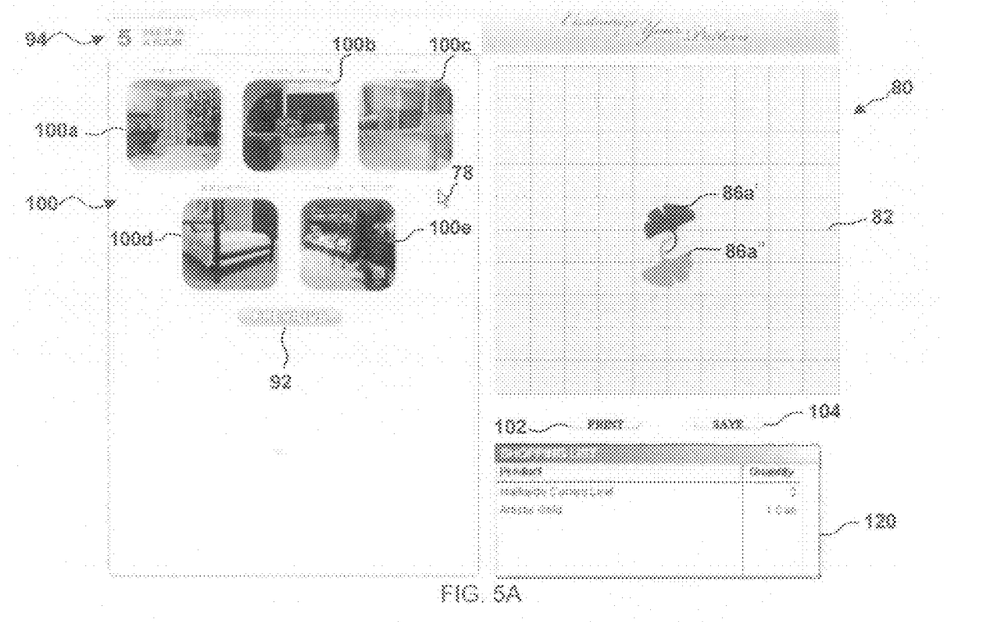
FIGS. 5A-5B illustrate three-dimensional representation screens according to a fifth embodiment.

After the user has finished applying color 96 to the one or more patterns 86 on the surface 80, the user clicks the "Next" button 76 to arrive at the screen of FIG. 5A. More specifically, once the user has finished modifying the representation of the surface 80, the user can instruct the system 20 to generate a three-dimensional view of a room 100 that includes a rendering of the modified representation 80. In the present embodiment, the modified representation 80 can be rendered in a plurality of different rooms 100 that are displayed as buttons/icons with a visual representation of the room. The rooms 100 in FIG. 5A include an office 100a, a living room 100b, a den 100c, a bedroom 100d, and a child's room 100e. In other embodiments, fewer or additional rooms 100 can be selected from, as would be apparent to a person of ordinary skill. The three-dimensional views of the various rooms 100a-100e can be saved in the computer memory 30 and/or server memory 36, loaded by the computer 22 and/or the server 32, respectively, at the request of the user, or otherwise made available for selection in any other known manner. Further, each of the different rooms 100 can include different dimensions, lighting and shading, and furniture arrangements, so that the user can view the modified representation 80 in a virtual environment that most closely resembles the actual environment where the representation is to be applied.

Figure 5B:
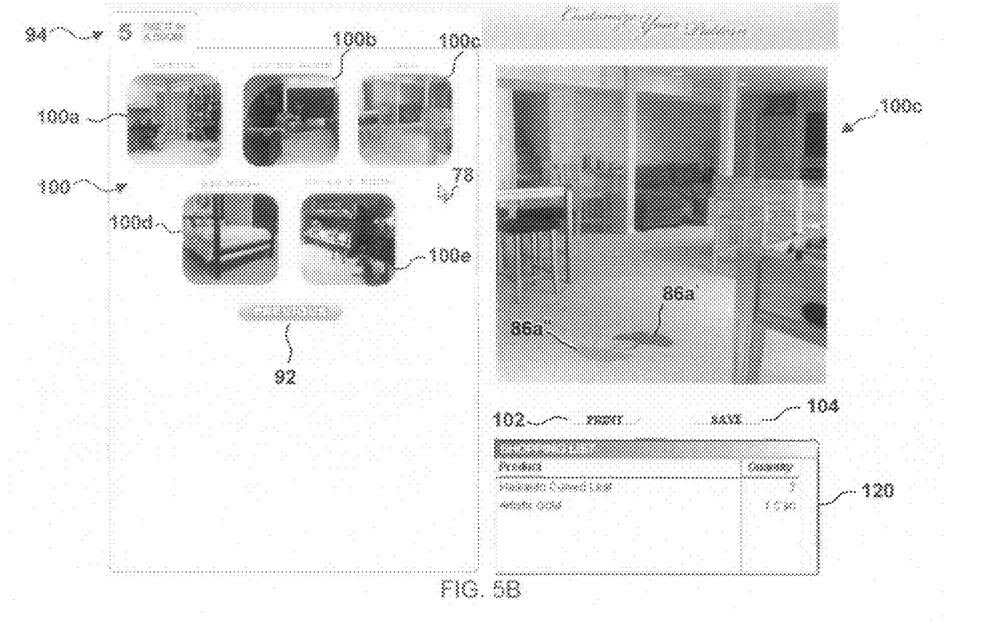

FIG. 5B illustrates a three-dimensional view of a den 100c' with the modified representation 80 rendered on a floor thereof. The rendering of the modified representation 80 on the three-dimensional view of a room 100 can be performed using any known procedure. In one embodiment, the rendering procedure generally includes retrieving the modified representation 80 and the three-dimensional view of the room 100, orienting the modified representation 80 to match the position and orientation of a floor in the selected three-dimensional view, distorting and/or scaling the modified representation 80 according to the approximate room dimensions in the three-dimensional view, and overlaying the three-dimensional view on the modified representation. In another embodiment, the rendering procedure further includes generating simulated colors, applying shading and/or lighting associated with the three-dimensional view of the room 100 onto the modified representation 80 before or after the overlaying step. If the user is not satisfied with the modified surface 80, then the user can click on the "Previous" button 92 or on an appropriate tab 94 to further modify the representation 80. However, if the user is satisfied with the modified representation 80, then the user can click on a "Print" button 102 or a "Save" button 104 with the cursor 78 to print or save the modified representation, respectively, as would be apparent to one of ordinary skill. By way of non-limiting example, if the user clicks on the "Print" button 102, then a print screen (not shown) can be displayed and the user can select a printer, define one or more preferences, and print the modified representation 80. In another non-limiting example, if the user clicks on the "Save" button 104, then a save screen can be displayed (not shown) and the user can enter a new name for the modified representation 80 or save over an old representation, designate a location where the modified representation 80 will be saved, and save the representation. The location where the modified representation 80 will be saved can be on the computer memory 30 and/or server memory 36 or on an external device, e.g., a flash memory drive or a CD. Further, in one embodiment, information related to the saved representation of the surface 80 is also stored, such information can include the username of the user that created the representation, the dimensions of the representation, the patterns used, the colors, positions, and orientations of the patterns used, and the like. Such "Print" and "Save" buttons 102, 104, respectively, are available throughout various screens, for example, in FIGS. 4B-4D.

Figure 6A:
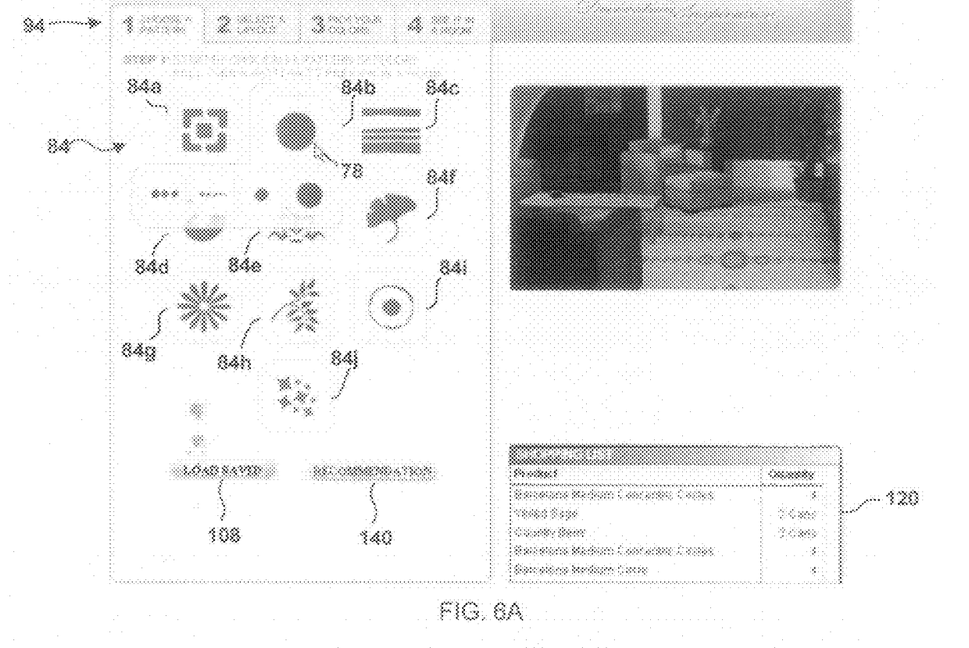
FIGS. 6A-6C illustrate design layout screens according to a sixth embodiment.
Figure 6B:
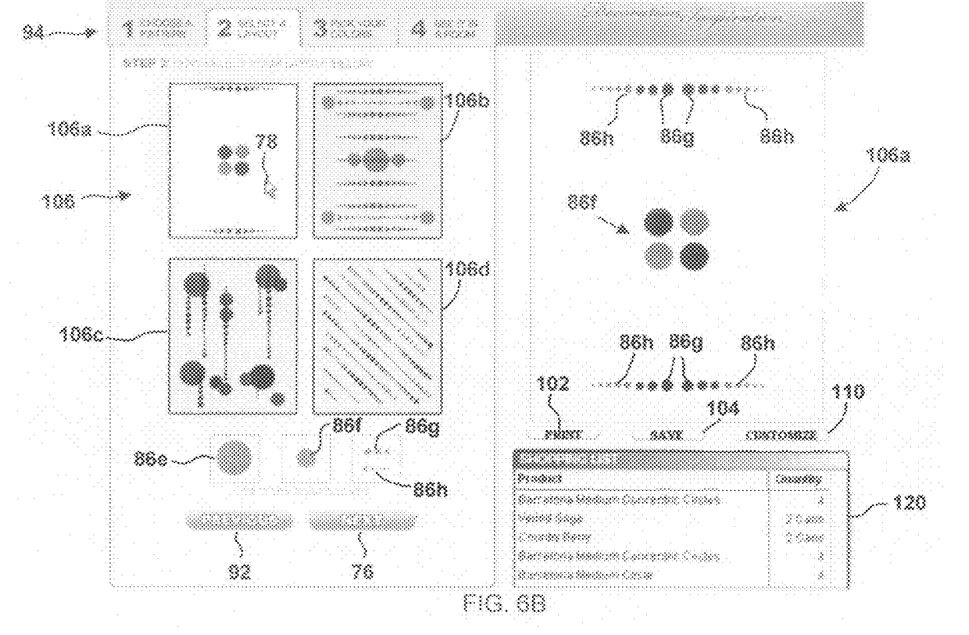
Figure 6C:
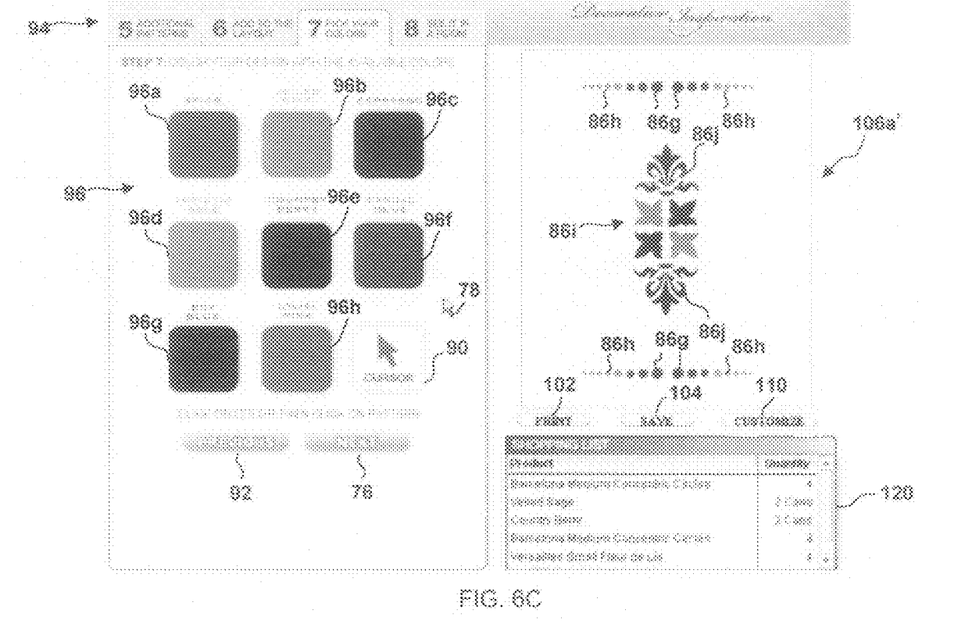

Referring to the screens of FIGS. 6A-6C, an embodiment is depicted that allows a user to select a pre-defined representation or layout 106 (see e.g., FIG. 6B) and modify such layout. In one embodiment, a plurality of pre-defined representations 106 are available for a user to select from. The pre-defined representations 106 can be saved in the computer memory 30 and/or server memory 36 or can be loaded by a user using known methods. In one example, a plurality of pre-defined representations 106 are organized in pattern categories 84, similar to the pattern categories discussed above. In FIG. 6A, the user is allowed to select from the pattern categories 84 by clicking on a pattern category with the cursor 78. Further, the user is allowed to load a pre-defined representation 106 that the user previously created and saved by clicking on a "Load Saved" button 108 with the cursor 78. In one embodiment, the user may be required to login after clicking on the "Load Saved" button 108 before being allowed to load a previously created representation 106. However, in other embodiments, the user is allowed to load any pre-defined representation 106 regardless of whether the user is registered or has logged in.

FIG. 6B illustrates various pre-defined representations 106a, 106b, 106c, and 106d that are found in the circles pattern category 84b and patterns 86e, 86f, 86g, and 86h that make up the various pre-defined representations. In other embodiments, each of the pattern categories 84 includes one or more different representations 106 that can be selected by the user. In FIG. 6B, the user has selected the first representation 106a in the circles pattern category 84b, wherein the first representation is displayed on the right portion of the screen. Thereafter, the user can print or save the representation by clicking on the "Print" or "Save" buttons 102, 104, respectively, as noted above. However, in addition, the user can click on a "Customize" button 110 to modify the pre-defined representation 106. In the present embodiment, the user can modify the representation 106 using the same or different techniques as those described above with respect to FIGS. 4A-4D.

Figure 7:
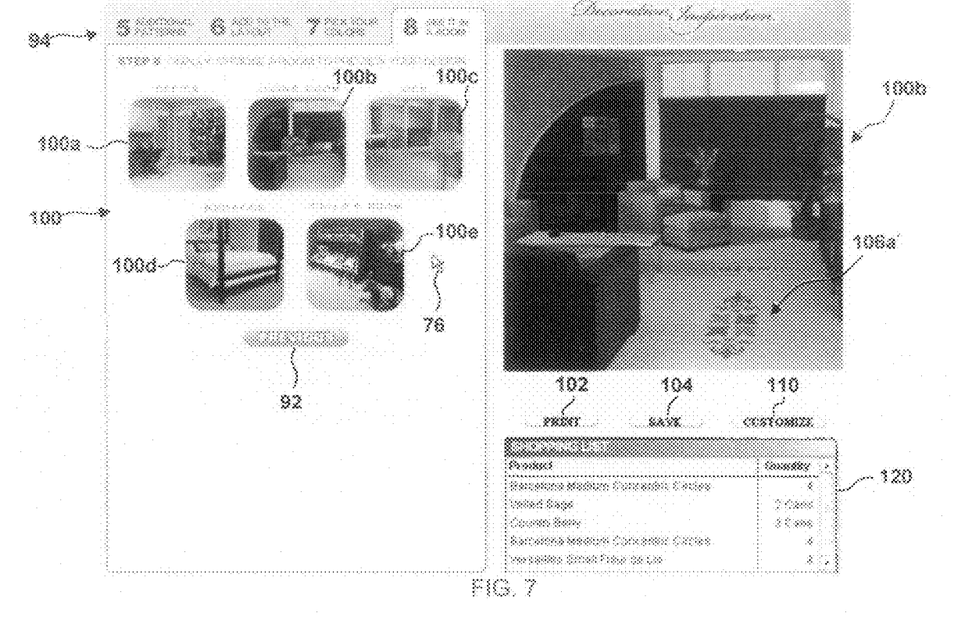
FIG. 7 illustrates a three-dimensional representation screen according to a seventh embodiment.

FIG. 6C illustrates an embodiment, wherein the user has customized the representation 106a to develop a modified representation 106a' by replacing the circles 86f in the center of the representation with four small fleur de lis 86i and adding two larger fleur de lis 86j to the representation. Further, the user has applied color 96 to the various fleur de lis 86i, 86j, in the same manner as described above with respect to FIG. 4D. Once the user is satisfied with the modifications to the representation, the user can instruct the system 20 to generate a three-dimensional view of a room 100 that includes a rendering of the modified representation 106a', as discussed above. In FIG. 7, the user has selected a living room 100b in which to render the modified representation 106a'. Thereafter, the user can print, save, and/or customize the modified representation 106a' by clicking on the respective buttons 102, 104, 110, as discussed above.

Figure 8A:
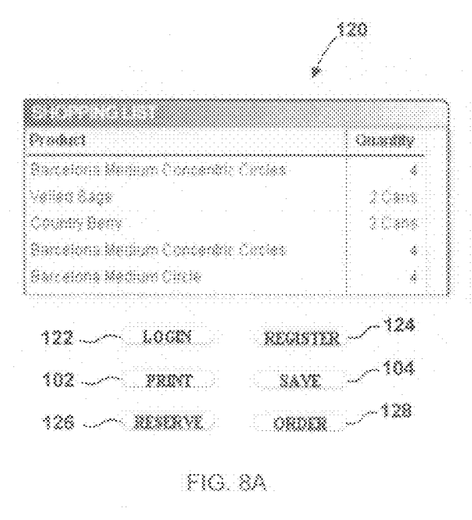
FIGS. 8A and 8B illustrate print/save/checkout screens according to an eighth embodiment.
Figure 8B:
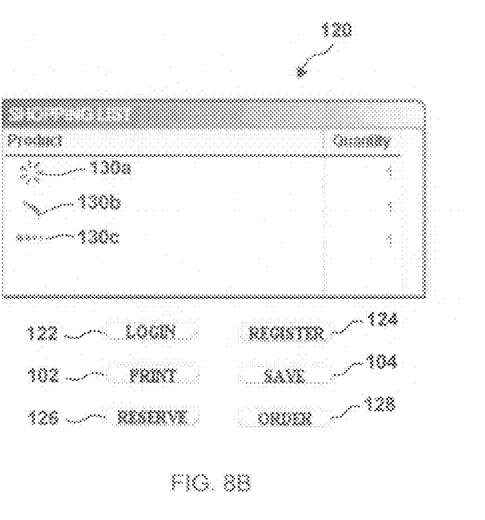

FIG. 8A illustrates a print/save and checkout screen that can be accessed by clicking on the "Print" button 102, the "Save" button 104, and/or a "Checkout" button (not shown). In the above embodiments of FIGS. 4A-7, a shopping list 120 is depicted in a lower right corner of each respective screen. The shopping list 120 is populated with products needed to reproduce the representation onto a consumer-selected surface (such as the soft surfaces described above, a wall, furniture, etc.) as the patterns and colors are applied to the representation 68 and/or 106. In one embodiment, such products include stencils and cans of colorant that can be used according to the techniques disclosed in Shah et al. U.S. patent application Ser. No. 12/152,322 and Bass et al. U.S. patent application Ser. No. 12/152,405, which were incorporated by reference above. For example, in FIG. 4C, the shopping list 120 indicates that the user needs two Haikaido Curved Leaf stencils and in FIG. 4D the shopping list indicates that the user also needs one can of Artistic Gold colorant. Similarly, the shopping lists of FIGS. 6B, 6C, and 7 are populated with the stencils and cans of colorant that may be used to reproduce the representation onto a consumer-selected surface. Referring to FIG. 8A, the shopping list 120 is populated with the products needed to implement the first representation 106a in the circles category 84b (see FIG. 6B). In FIG. 8A, the user is allowed to login or register if the user has not previously done so by clicking on a "Login" button 122 or a "Register" button 124, respectively. Further, the user can print or save the shopping list by clicking on the "Print" button 102 or the "Save" button 104, respectively, as discussed above. In the present embodiment, the screen of FIG. 8A also includes a "Reserve" button 126 and an "Order" button 128. In one example, if the user clicks on the "Reserve" button 126, then one or more items listed on the shopping list 120 can be selected and reserved at a store that sells such items. Such store can be a physical store or an online/virtual store. The store can be notified of the reservation through any known means. In one example, a computer at the store is connected via the internet to the server 32, which is further connected to a user's computer 22, wherein the computer at the store is notified electronically of the reservation, e.g., by email. In another example, the computer 22 is embodied in a kiosk at the store and the selected items are reserved in the store's inventory using any known means. If the user clicks on the "Order" button 128, then one or more items listed on the shopping list 120 can be selected and ordered from a store, which can likewise be a physical store or an online/virtual store. After clicking on the "Order" button 128, the user will be asked to submit payment information, e.g., a credit card number, and the user may select one of various delivery options, e.g., regular or expedited shipping or in-store pick up. In another embodiment of the shopping cart 120 illustrated in FIG. 8B, the products are depicted by the actual shape of the stencil and color of the colorant instead of names, e.g., the Barcelona Medium Concentric Circles stencil and the Veiled Sage colorant of FIG. 8A. Instead, FIG. 8B illustrates first, second, and third stencils 130a, 130b, and 130c that were used to design a representation of a surface 80. Thus, the user can quickly review the shopping list 120 by looking at the shapes instead of having to remember the name of each of the different patterns.

In another embodiment, the system is configured to display recommend patterns, layouts, and/or color-schemes to the user. These recommendations can be made actively or passively. For example, the recommendations can be made actively if the user clicks on a "Recommendations" button 140 (shown in FIG. 6A) or the recommendations can be made passively by merely displaying such recommendations in one of the screens, such as the screens of FIGS. 6A and 6B. Other ways of providing the recommendations can be used, as would be apparent to one of ordinary skill.

Figure 9:
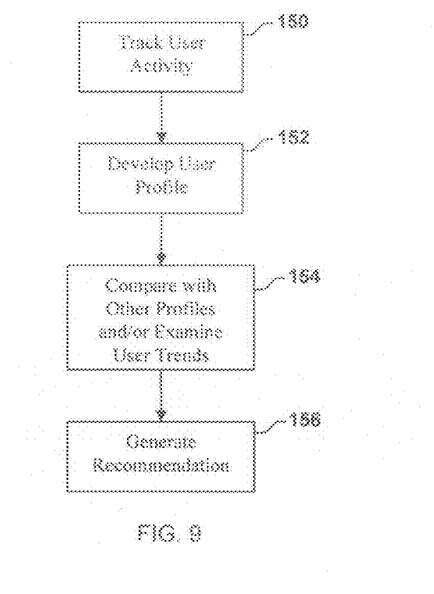
FIG. 9 is a flowchart that illustrates programming according to a ninth embodiment that may be executed to manage one or more users and to provide recommendations to such users.

FIG. 9 illustrates one embodiment of programming that can be executed by the system 20 described above to provide such recommendations, wherein the programming begins at a block 150 to track a user's activity throughout the design of a representation of a surface. In one embodiment, the user is a registered user that has logged in. However, in other embodiments the user need not be registered or can merely remain anonymous. In either situation, during the block 150, the system develops a log of user activity that includes the choices that the user makes, e.g., patterns and colors selected, placement of patterns individually and/or in groups, use of the "Eraser" button 88 described above, loading of pre-defined representations, saving representations, switching between different screens, and the like. In one embodiment, all user activities are tracked, regardless of the final design of the representation of the surface. In a block 152, a profile for the user is developed from the log of user activity. The profile can also be developed from other user information, such as logs of user activity during previous logins and/or information gathered through a questionnaire. Such information may include a room type to be designed, a size of the room, a general furniture arrangement in the room, a lighting level in the room, the user's age and income level, the user's zip code, and other information that would be apparent to one of ordinary skill. The profile for the user is stored in memory, such as the computer memory 30 and/or server memory 36, along with default profiles and/or profiles for other registered and anonymous users. During a block 154, the user's profile is retrieved from memory and compared with the stored default profiles and/or profiles of other users to identify similar profiles and design choices that have been found to be common among such similar profiles. Any appropriate matching algorithm can be used to identify similarities in user profiles, such as finding similar pattern arrangements, color proportions, room size or proportion, exact pattern/color matches, similar geographic locations, etc., as would be apparent to one of ordinary skill. In one embodiment, the matching algorithm can give different weights to certain patterns, layouts, colors, etc., in order to identify most relevant matches to the user. Based on the comparison of the block 154, a block 156 generates a recommendation that is provided to the user, as discussed above. Alternatively or in conjunction, the block 154 can examine user trends that are used to generate the recommendation of the block 156. For example, such user trends can include an analysis of the most common design choices or trends, such as popular colors and patterns, combinations of colors and patterns, typical density of patterns based on room size, common three-dimensional room selections, and/or whether users prefer to start with a blank representation of the surface or a pre-defined representation. In an additional embodiment, the system 20 can track time and date data to discern patterns in access and match such data with reservation and/or purchase data to gauge sale conversions.

The systems and method described herein allow a user to conveniently and effectively develop a design on a two-dimensional representation of a surface. Further, the user can evaluate the two-dimensional design in a simulated real-world environment, such as a three-dimensional room where the design is to be applied, to evaluate whether to proceed with the application of such design to the surface or to further modify the design. Still further, design recommendations can be provided to the user based on the user's profile and other profiles to assist the user during the design processes. Additionally, the user can easily obtain or purchase the necessary products to apply the design to the surface in one embodiment.

Other embodiments comprising various combinations of the individual features of each of the foregoing described embodiments are specifically included herein.

INDUSTRIAL APPLICABILITY

The present invention facilitates the design of a surface by a user and the display of such design in a simulated real-world environment to aid the user in evaluating whether such design is satisfactory or requires modification.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated herein by reference in their entirety.

We claim:

1. A method of designing a consumer-selected surface, the method comprising:
   displaying a representation of a surface;
   displaying one or more patterns that may be applied to the representation of the surface;
   receiving a selection from a user of a pattern selected from the one or more patterns;
   allowing the user to locate the selected pattern at a position on the representation of the surface, the position being independent of a size or shape of the selected pattern;
   allowing the user to modify the positioned pattern by altering at least one characteristic thereof to develop a modified representation of the surface;
   generating a three-dimensional view of a room that includes a rendering of the modified representation of the surface; and
   providing the generated three-dimensional view to the user.

2. The method of claim 1, wherein the representation of the surface is a two dimensional representation.

3. The method of claim 1, wherein the surface is a soft surface.

4. The method of claim 1, wherein the at least one characteristic is an orientation or color of the pattern.

5. The method of claim 1, wherein the step of generating includes at least one of allowing the user to select from a plurality of different rooms and simulating a color that is a mixture of a color of the pattern and a color of the consumer-selected surface.

6. The method of claim 5, wherein the plurality of different rooms are different sizes and include different lighting and/or furniture arrangements.

7. The method of claim 1 further comprising the steps of storing information for one or more users and recommending one or more patterns to the user based on the stored information.

8. The method of claim 1 further comprising the step of providing a list of products that are needed to reproduce the modified representation of the surface on the consumer-selected surface.

9. The method of claim 8, wherein the list of products is listed by shape and/or color.

10. The method of claim 8, wherein the list of products includes a stencil and/or a colorant and the method further comprising the step of allowing the user to place an order to purchase at least one of the products.

11. The method of claim 8, wherein the pattern is supplied by the user from a drawing or a scan.

* * * * *